United States Patent [19]
Schlegel et al.

[11] Patent Number: 5,601,146
[45] Date of Patent: Feb. 11, 1997

[54] HITCH ASSEMBLY FOR A TRACTOR

[75] Inventors: Daniel K. Schlegel, Racine; Michael D. Morton, Salem, both of Wis.

[73] Assignee: Case Corporation, Racine, Wis.

[21] Appl. No.: 515,517

[22] Filed: Aug. 15, 1995

[51] Int. Cl.$^6$ .................................................. A01B 59/043
[52] U.S. Cl. ........................ 172/439; 172/450; 280/474
[58] Field of Search ................................. 172/439, 440, 172/442, 444, 446, 450, 191, 272; 180/22, 696, 235, 329, 474, 900

[56] References Cited

U.S. PATENT DOCUMENTS

| | | |
|---|---|---|
| 2,780,160 | 2/1957 | Harris . |
| 3,310,123 | 3/1967 | Abbott . |
| 3,399,733 | 9/1968 | North . |
| 3,910,355 | 10/1975 | Elfes et al. ............................ 172/450 |
| 3,994,347 | 11/1976 | Schowalter . |
| 4,198,074 | 4/1980 | Ishiguro ................................ 172/446 |
| 4,397,359 | 8/1983 | Price et al. ........................ 172/450 X |
| 4,470,613 | 9/1984 | Sykes . |
| 4,519,623 | 5/1985 | Orthman .............................. 172/439 |
| 4,862,971 | 9/1989 | Azzarello et al. . |

Primary Examiner—Terry Lee Melius
Assistant Examiner—Robert Pezzuto
Attorney, Agent, or Firm—Foley & Lardner

[57] ABSTRACT

A hitch assembly for a work vehicle, such as an agricultural tractor, includes a pair of mounting brackets, a rocker pivotally mounted on the brackets, a pair of draft links secured to the brackets, a pair of actuators coupled between the brackets and the rocker and a pair of lift links coupled between the rocker and the draft links. The mounting brackets are generally C-shaped unitary structures that include a rocker support, an actuator support and a draft link support, preferably all lying within a common plane, permitting forces to be transmitted to the bracket and to the vehicle with a minimum of lateral bending stress. The brackets are preferably identical to one another and include mounting pads on both sides, permitting the brackets to be interchangeably mounted on either the left or the right side of the vehicle. The assembly may be easily mounted to the vehicle by attaching the brackets in appropriate corresponding locations on the vehicle and subsequently mounting the other components on the brackets. The use of self-similar, interchangeable mounting brackets reduces the number of different parts in the assembly and facilitates mounting. Because two separate brackets, each bracket is typically lighter and more manageable than are mounting structures in conventional hitches.

23 Claims, 5 Drawing Sheets

HITCH ASSEMBLY FOR A TRACTOR

BACKGROUND OF THE INVENTION

The present invention relates generally to a hitch assembly for a tractor or similar work vehicle. More particularly, the invention relates to a hitch assembly adapted for installation as original equipment on vehicles such as tractors, or as a retrofit on vehicles originally outfitted with only a drawbar or with no draft structure. The assembly may be used as a fully or semi-mounted hitch and has a greatly simplified and accessible structure as compared to conventional hitch assemblies, reducing the number of parts and the weight of the hitch assembly and facilitating mounting and servicing of the hitch components.

In the art of hitch assemblies for tractors and other work vehicles, a variety of structures have been proposed and are currently in use. Conventional hitch assemblies typically include a rocker assembly for raising and lowering an implement coupled to the hitch, one or more hydraulic cylinders connected to the rocker assembly and a pair of draft links for mounting and pulling an implement. Such hitches also commonly include a third or upper link that cooperates with the rocker assembly and draft links to maintain a desired orientation of the implement.

The rocker assembly of conventional tractor hitches typically includes a rockshaft splined to receive rocker arms as well as a bell crank or lever for rotating the rockshaft in response to extension and retraction of a hydraulic cylinder. The rockshaft is supported on journal bearings either inboard or outboard of the rocker arms. For rear-mounted hitches, the rockshaft journal bearings are typically provided in a massive support casting secured to the upper, rear or side surfaces of the differential housing. For raising and lowering the hitch either a single or a pair of lift cylinders may be provided. Where a single lift cylinder is used, the cylinder is generally located within the differential housing and cooperates with a central bell crank or lever splined to the rockshaft. Where two lift cylinders are present, the cylinders are typically external to the differential housing and are mounted on either side of the tractor rear differential. In both cases the rocker arms are connected to the draft links via lift links including turn buckles and are raised and lowered by rotation of the rockshaft and rocker arms. Hitch assemblies generally of this type are described in U.S. Pat. No. 3,399,733, issued to North on Sep. 3, 1968, U.S. Pat. No. 3,994,347, issued to Schowalter on Nov. 30, 1976, U.S. Pat. No. 4,470,613, issued to Sykes on Sep. 11, 1984 and U.S. Pat. No. 4,862,971, issued to Azzarello et at. on Sep. 5, 1989.

While conventional tractor hitches of the type described above have provided a useful and reliable tool for positioning and manipulating implements, they are not without drawbacks. A first significant drawback with such conventional hitch assemblies is the difficulty of servicing the hitch components, particularly the rocker assembly and lift cylinders. Where a lift cylinder is located in the rear differential housing, routine septicing of the cylinder, such as for replacement of worn seals, requires removal of the hitch support casting and partial dismantling of the differential. Similarly, for both internal and external cylinder designs, servicing of the rockshaft bearings, bearing seals or the rockshaft itself requires dismantling of the rocker assembly.

Another important drawback of conventional hitch designs stems from the size, weight and complexity of the hitch support structure. Where a hitch is installed as original equipment on a vehicle, this support structure may be simplified to some extent by integrating portions into the differential housing structure. However, to provide the flexibility to retrofit vehicles not originally equipped with a hitch and to reduce the cost of vehicles on which a hitch is not required, a number of schemes have been devised for attaching an add-on support structure to the tractor frame, typically by bolting one or more support castings to the differential housing. Moreover, certain known designs incorporate several additional features into a single add-on support casting, such as a power take off (PTO) and drawbar. While this add-on approach to hitch design provides a degree of flexibility for the vehicle owner, known add-on hitch assemblies include massive cast metal supports, typically weighing several hundred pounds. The size and weight of these supports not only render the hitch difficult to mount, but often require special handling equipment and several service personnel to remove and replace, thereby reducing the field serviceability of the hitch. In addition, where several features are included in a single add-on support, the vehicle owner may have to remove the hitch or one of the other features from service during repair or servicing of the support or the components of a single feature.

The present invention features a novel hitch assembly that can be installed as original equipment on a tractor or other work vehicle, or that can be easily field retrofitted the need for dismantling of the differential or other systems on the vehicle. The hitch assembly comprises a simple structure including relatively light weight supports that may be field mounted and removed when necessary. The entire assembly remains completely accessible when installed and is preferably independent of other operating features of the vehicle, thus greatly facilitating servicing. In a particularly preferred configuration, the rocker and attachment supports are designed to provide an extremely advantageous geometry for transmitting forces on the rocker, the hitch links and the lift cylinders to the attachment structure and the tractor frame.

SUMMARY OF THE INVENTION

In accordance with a first aspect of the invention, a hitch assembly is provided for a work vehicle such as an agricultural tractor. The hitch assembly includes a first and a second hitch support, a rocker, a pair of hitch actuators, a pair of draft links and a pair of lift links. Each hitch support includes a plurality of mounting apertures for attaching the hitch to the vehicle, an actuator support for receiving and supporting a hitch actuator, a rocker support for receiving and supporting a rocker and a draft link support for receiving and supporting a draft link. The rocker is pivotally disposed on the rocker supports and includes a rockshaft and a pair of rocker arms. The rocker is configured to receive a pair of hitch actuators for causing rotation of the rocker arms. The hitch actuators are each coupled to one of the actuator supports and to the rocker. The hitch actuators are movable between hitch raised and hitch lowered positions to cause raising and lowering movement of the rocker arms. The draft links are each pivotally supported on a respective draft link support. The lift links are each coupled to a respective draft link and to a rocker arm to cause pivotal movement of the draft links in response to corresponding movement of the rocker arms.

In accordance with another aspect of the invention, a bracket is provided for mounting a hitch on a work vehicle such as an agricultural tractor. The bracket is designed particularly for hitches of the type including a rocker comprising a rockshaft and a pair of spaced apart rocker arms, a pair of draft links, a pair of lift links coupled to respective rocker arms and draft links, and a pair of actuators for selectively pivotally moving the rocker arms and draft links. The bracket includes a plurality of apertures configured to receive mounting fasteners for attaching the hitch to the vehicle. The bracket also includes an actuator support for receiving and supporting one of the hitch actuators, and a rocker support for receiving and supporting a portion of the rocker. The actuator support and the rocker support lie substantially within a common plane. In a preferred embodiment, the bracket includes a draft link support, also lying within the plane of the actuator and rocker supports.

In accordance with another aspect of the invention, a bracket for mounting a hitch on a work vehicle includes a plurality of apertures configured to receive mounting fasteners for attaching a hitch to a vehicle, an actuator support for receiving and supporting a hitch actuator and a rocker support for receiving and supporting a portion of a rocker, wherein the bracket is configured to be interchangeably mounted to a left or a right side of the vehicle. The invention also relates to a bracket including a plurality of apertures for mounting a hitch to a vehicle, an actuator support and a draft link support, wherein the bracket is configured to be interchangeably mounted to a left or a right side of the vehicle.

In accordance with a further aspect of the invention, a method is provided for mounting a hitch to a work vehicle such as an agricultural tractor. The method includes the steps of attaching a pair of interchangeable support brackets to the vehicle, each support bracket including a rocker support, an actuator support and a draft link support, and pivotally mounting a rocker to the rocker supports. The rocker includes a pair of rocker arms, and the method provides for securing a hitch actuator to each actuator support and to a respective rocker arm. The method then includes the further steps of pivotally mounting a draft link to each draft link support and coupling a lift link to each draft link and to a respective rocker arm.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
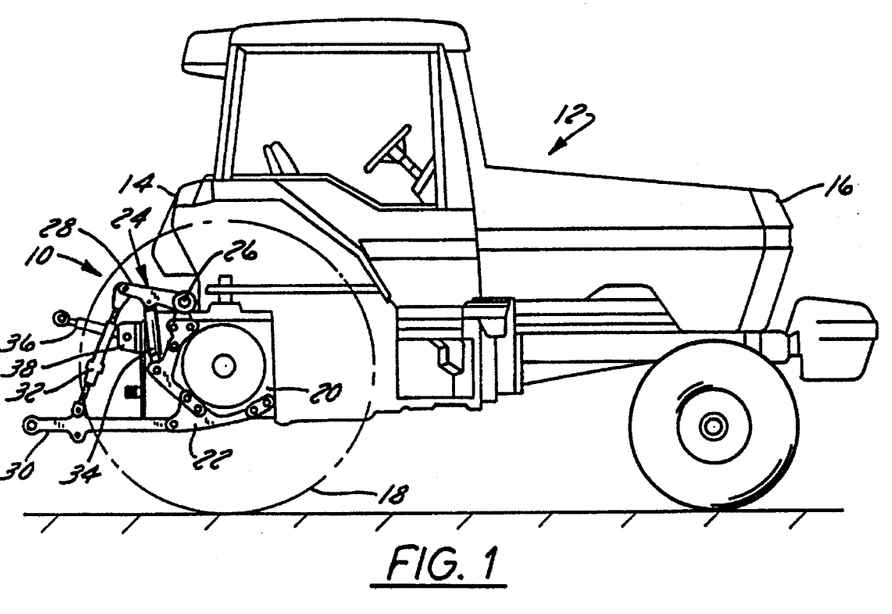
FIG. 1 is a side view of an agricultural tractor on which an exemplary hitch assembly in accordance with the invention is shown mounted.

Turning now to the drawings and referring to FIG. 1, an exemplary hitch assembly 10 in accordance with the invention is shown mounted on an agricultural tractor 12. As illustrated in FIG. 1, hitch assembly 10 is particularly suited for mounting on the rear structure 14 of tractor 12 as will be described in greater detail below. However, it should be understood that the assembly may be adapted to fit on the front structure 16 of such agricultural tractors or may be fitted to other types of work vehicles requiring vertical displacement of a work implement. Inasmuch as such adaptations fall within the scope of the appended claims, the present invention is intended to extend to them as well as the presently preferred embodiments described herein.

Figure 2:
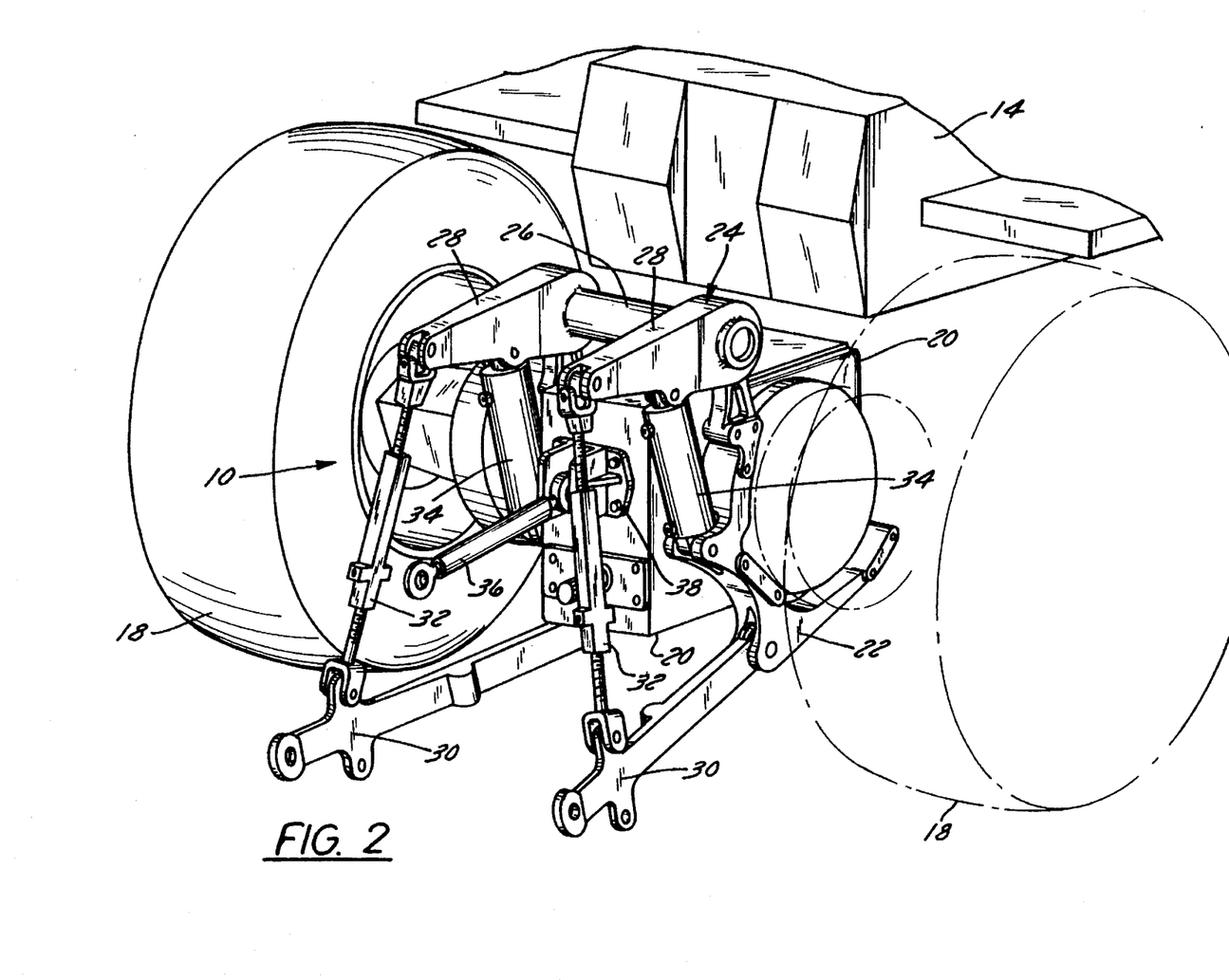
FIG. 2 is a perspective view of an exemplary embodiment of the hitch assembly of FIG. 1 shown mounted on the rear differential housing of a tractor.

Hitch assembly 10 may be conveniently mounted between left and right rear tires 18 of tractor 12, such as on the rear differential housing 20 of tractor 12. Alternatively, hitch assembly 10 may be supported on rear axle carriers (not shown), a structural frame or other structural elements of tractor 12. To facilitate such mounting and to support the various elements of the hitch, assembly 10 includes a pair of support brackets 22, preferably of identical construction and adapted for mounting interchangeably on either the left or right side of the vehicle. As best illustrated in FIG. 2, mounted on and supported by brackets 22, assembly 10 also includes a rocker 24 having a rockshaft 26 and rocker arms 28, a pair of draft links 30, a pair of lift links 32 coupled between rocker arms 28 and draft links 30, and a pair of actuators 34 such as hydraulic cylinders. In addition to these elements, assembly 10 may include a third or upper link 36 secured to tractor 12 via a mounting bracket or extension 38.

As will be readily appreciated by those skilled in the art, once assembled as illustrated in FIG. 2, actuators 34 are fluid coupled to a hydraulic system (not shown) which may be of conventional design, including valving for selectively extending and retracting actuators 34. Such selective activation of actuators 34 forces rocker 24 to rotate on brackets 22, pivotally raising and lowering rocker arms 28. Because rocker arms 28 are coupled to lift links 32 and thereby to draft links 30, such pivotal raising and lowering of rocker arms 28 correspondingly pivotally raises and lowers draft links 30 on brackets 22, thereby lifting and lowering implements (not shown) mounted on draft links 30. As in conventional three point hitches, such implements may be fully mounted by connecting the implements to upper link 36.

Figure 3:
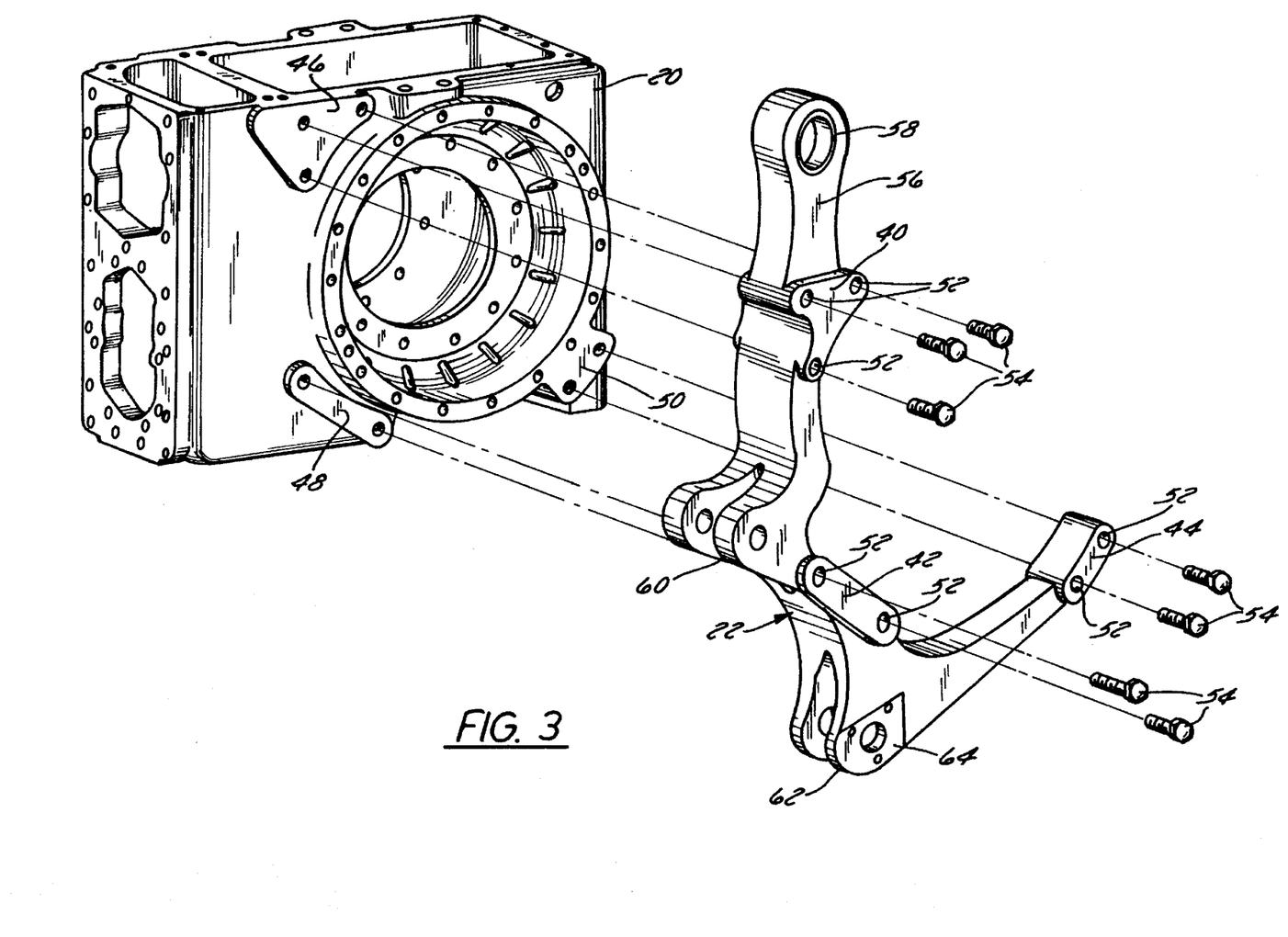
FIG. 3 is a perspective view of a preferred support bracket in accordance with the invention for securing the elements of the hitch assembly to the vehicle.

As best illustrated in FIG. 3, each bracket 22 includes several mounting pads for mounting the bracket 22 to vehicle 12, as well as several support structures for pivotally supporting other elements of hitch assembly 10. In the preferred embodiment illustrated, bracket 22 is a generally C-shaped, unitary structure including three mounting pads 40, 42 and 44. Mounting pads 40, 42, 44 are arranged at upper, intermediate and lower positions respectively for contacting and bearing against corresponding mounting pads 46, 48 and 50 on differential housing 20, or another structural element of vehicle 12 on which brackets 22 are mounted. Bolt holes 52 are formed through each mounting pad 40, 42, 44 for receiving bolts 54 or similar fasteners for securing bracket 22 to the vehicle. A tang 56 including a rocker support 58 extends upwardly from a point adjacent to upper mounting pad 40 for supporting rocker 24 as described below. Actuator and draft link supports 60 and 62 respectively, preferably formed as clevis-type mounts extend rearwardly on bracket 22 for supporting an end of an actuator 34 and a draft link 30. On either side of draft link supports 62, a pad 64 is provided for mounting a draft sensor, which may be of a type well known in the art, for generating a signal representative of draft force engendered by interaction of an implement coupled to draft links 30 and the ground.

In the embodiment of bracket 22 illustrated, each bracket 22 is of identical construction, having mounting pads 40, 42 and 44 formed in mirror-image locations on both right and left sides thereof and having rocker support 58, actuator support 60 and draft link support 62 lying substantially in a common plane. Several important advantages flow from this preferred arrangement. For example, the use of identical mounting brackets 22 reduces the number of different parts in assembly 10, facilitating manufacturing, stocking and servicing of the hitch. In addition, in this preferred construction brackets 22 may be interchangeably mounted on either the left or right side of vehicle 12, facilitating assembly of the hitch. Moreover, because supports 58, 60 and 62 lie substantially in a common plane, forces exerted by actuators 34, or on rocker 24 and draft links 30 during operation are transmitted to bracket 22 with a minimum of lateral bending stress on bracket 22 or on the portion of vehicle 12 supporting the bracket.

Figure 4:
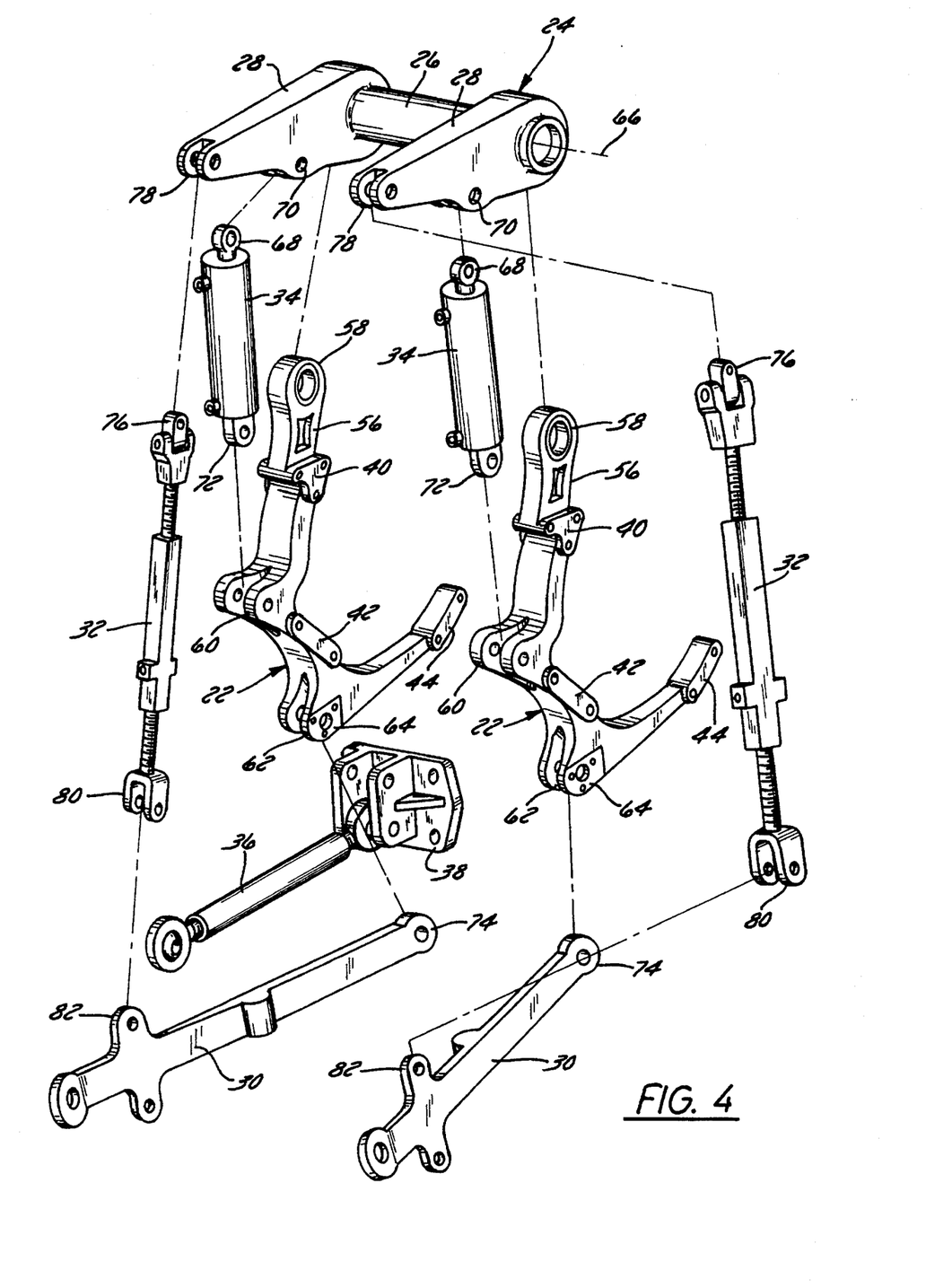
FIG. 4 is an exploded perspective view illustrating the preferred interconnection between the primary components of the hitch assembly of FIG. 1.

Once brackets 22 are mounted on vehicle 12, the other components of hitch assembly 10 are joined as illustrated in FIG. 4. Thus, rocker 24 is lowered over rocker supports 58 of brackets 22 and fixed to supports 58 pivotally about a rotational axis 66 as described more fully below with respect to FIG. 5. An upper end 68 of each actuator 34, typically a tang end of a cylinder rod, is then coupled to an actuator support 70 on each rocker arm. Actuator supports 70 are preferably configured as clevis-type connections having mutually aligned mounting holes for receiving a clevis pin (not shown) or similar removable fastener for securing end 68 of actuator 34 to support 70 in a conventional manner. A lower end 72 of actuator 34 is then coupled to actuator supports 60 on brackets 22 in a similar manner. Draft links 30 are fitted to draft link supports 62 of brackets 22 by positioning a tang end 74 of each draft link 30 into draft link supports 62 and again inserting a clevis pin (not shown) or similar fastener to pivotally link the draft links to the brackets. Lift links 32 are secured between rocker arms 28 by inserting an upper tang 76 on each lift link 32 into another clevis-type lift link support 78 provided near the end of each rocker arm 28 and inserting a clevis pin (not shown). To complete the structure, each lift link 32 is coupled to a corresponding draft link 30 by fitting a clevis end 80 of the lift link 32 over a tang 82 of the draft link 30 and inserting a clevis pin through the end and tang. Upper link 36 may be secured to mounting bracket 38 in any conventional manner, such as by a clevis pin (not shown). As will be apparent to those skilled in the art, other configurations for the connecting ends of the various elements of hitch assembly 10, i.e. attachment structures other than conventional clevis-and-tang type connections may be envisioned as alternatives to the specific connections described above.

Figure 5:
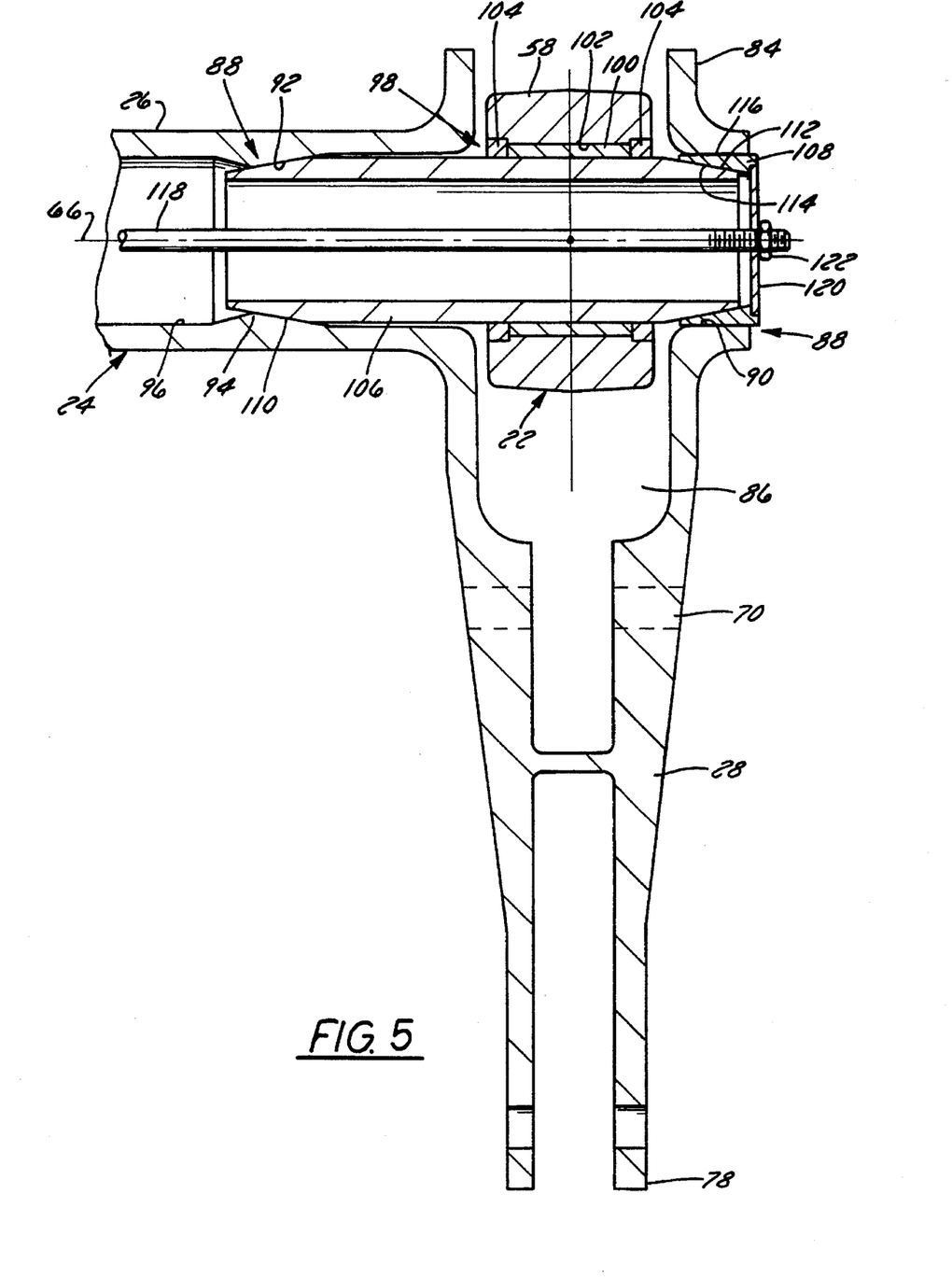
FIG. 5 is a partial sectional view the rocker of the hitch illustrated in FIG. 1, depicting a preferred arrangement for pivotally mounting the rocker on a rocker support portion of the support bracket shown in FIG. 3.

To facilitate mounting rocker 24 on brackets 22, rockshaft 26 is preferably a hollow, tubular structure extending between rocker arm bases 84 of each rocker arm 28 as best illustrated in FIG. 5. FIG. 5 shows one side of rocker 24, including the base 84 of one rocker arm 28 pivotally mounted on a rocker support 58, the opposite side of the assembly being a mirror image of the structure shown. Within each rocker arm base 84 is a cavity 86 in communication with the interior of rockshaft 26. Bearings are provided within each base 84 and supported by bearing supports 88 formed within rocker 24 adjacent to cavity 86. FIG. 5 shows a preferred bearing arrangement for pivotally supporting rocker 24 on supports 58. Bearing supports 88 include an outer bearing support surface 90 and a tapered, centering bearing support surface 92 situated slightly within rockshaft 26. While outer bearing support surface 90 is generally straight cylindrical in form, centering bearing support surface 92 comprises an inclined face of an annular boss 94 extending from an inner wall 96 of rockshaft 26.

A bearing assembly 98 is positioned between bearing support surfaces 90 and 92 along rotational axis 66 of rocker 24. Each bearing assembly 98 includes a journal 100 fitted within an aperture 102 in rocker support 58 of mounting bracket 22, a pair of seals 104 on either side of journal 100, a support sleeve 106 and a locking member 108. Support sleeve 106 is a hardened, hollow metal sleeve having tapered ends 110 and 112. When installed as illustrated in FIG. 5, tapered end 110 of support sleeve 106 bears against centering support surface 92 and is centered by surface 92 along rotational axis 66, while tapered end 112 of support sleeve 106 bears against locking member 108. Locking member 108 is preferably a tapered split ring having a wedge-shaped cross section formed by an inclined surface 114 and a straight cylindrical surface 116. When installed in bearing assembly 98, locking member 108 engages tapered end 112 of support sleeve 106 and is wedged between the support sleeve and outer bearing support surface 90, again centering support sleeve 106 along rotational axis 66. To facilitate assembly of bearing assembly 98, tapered ends 110 and 112 may be substantially identical and support sleeve 106 may be symmetrical so as to permit installation of sleeve 106 with either tapered surface contacting centering support surface 92 and locking member 108.

A tension member 118 passes through rockshaft 26 and bearing assemblies 98 within each rocker arm base 84 to maintain bearing assemblies 98 tightly engaged within rocker 24. Tension member 118 passes through an annular retaining plate 120 positioned outboard of each locking member 108 on either side of rocker 24 to press locking members 108 into tight, wedged engagement between outer support surface 90 and sleeves 106 as tension member 118 is secured in place. In the presently preferred embodiment, tension member 118 is a high tensile strength rod having threaded ends for receiving nuts 122 (one only shown) for tightening bearing assemblies 98 within rocker 24 as it is mounted onto brackets 22.

The preferred internal structures of rocker 24 and bearing assemblies 98 as described above greatly facilitate mounting, dismantling and servicing rocker 24 and bearing assemblies 98, as well as the remaining elements of hitch assembly 10 as compared with known hitches. To mount rocker 24 in hitch assembly 10, rocker 24 is first lowered into place over brackets 22 with the rocker support 58 of each bracket penetrating into cavity 86 in each rocker arm base 84. A support sleeve 106 is then inserted through each rocker support 58, through seals 104 and journal 100 within support 58 and into loose abutment with centering support surface 92. Next, locking members 108 are pressed loosely into place between each sleeve 106 and outer bearing support surface 90. Tension member 118 is then inserted through rockshaft 26 and bases 84 with retaining plates 120 on either end thereof, and nuts 122 or similar tightening fasteners are tightened on tension member 118 to bring the entire structure into tight, centered engagement. Actuators 34, draft links 30 and lift links 32 may then be added as described above. Dismantling of all or a portion of hitch assembly 10 follows the reverse procedure.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

We claim:

1. A hitch assembly for a work vehicle, comprising:
   a first and a second hitch support, each support comprising a single piece structure including a plurality of mounting apertures for attaching the hitch to the vehicle, an actuator support, a rocker support and a draft link support;
   a rocker pivotally coupled to the rocker supports, the rocker including a rockshaft and first and second rocker arms;
   first and second hitch actuators coupled to the actuator supports of the first and second hitch supports respectively and to the rocker, the hitch actuators being movable between hitch raised and hitch lowered positions to raise and lower the rocker arms;
   first and second draft links pivotally supported on the draft link supports of the first and second hitch supports respectively; and
   first and second lift links coupled to the first and second draft links and to the first and second rocker arms respectively to pivotally move the draft links in response to corresponding movement of the rocker arms.

2. The hitch assembly of claim 1, wherein the vehicle includes a differential housing and a pair of axle carriers extending from the differential housing and wherein each hitch support comprises a generally C-shaped structure configured for mounting to the vehicle differential housing partially surrounding one of the axle carriers.

3. The hitch assembly of claim 1, wherein each hitch support is configured for mounting interchangeably on a left side or a right side of the vehicle.

4. The hitch assembly of claim 1, wherein the rockshaft and rocker arms comprise a single-piece rocker unit.

5. The hitch assembly of claim 1, wherein the actuator support, the rocker support and the draft link support of each hitch support lie substantially within a common plane.

6. The hitch assembly of claim 1, further comprising a support pad disposed on the vehicle for receiving and supporting an upper hitch link.

7. A bracket for mounting a hitch on a work vehicle, the hitch including a rocker comprising a rockshaft and first and second spaced apart rocker arms, first and second draft links, first and second lift links coupled to the first and second rocker arms and to the first and second draft links respectively, and first and second actuators coupled to the rocker for selectively pivotally moving the rocker arms, the lift links and the draft links, the bracket comprising:
   a plurality of apertures configured to receive mounting fasteners for attaching the hitch to the vehicle;
   an actuator support for receiving and supporting the first or the second hitch actuator; and
   a rocker support for receiving and supporting a portion of the rocker;
   wherein the actuator support and the rocker support lie substantially within a common plane.

8. The bracket of claim 7, wherein the rocker support is above the actuator support.

9. The bracket of claim 7 further comprising a draft link support for receiving and supporting the first or the second draft link.

10. The bracket of claim 9, wherein the actuator support is above the draft link support.

11. The bracket of claim 9, wherein the draft link support is a clevis structure comprising a pair of parallel tabs having apertures formed therein along a common axis.

12. The bracket of claim 9, wherein the actuator support, the rocker support and the draft link support lie substantially within a common plane.

13. The bracket of claim 7, wherein the bracket is configured for interchangeably mounting on a left side or a right side of the vehicle.

14. The bracket of claim 7, wherein the bracket is a generally C-shaped single-piece structure configured for mounting at least partially around a rear axle housing of the vehicle.

15. The bracket of claim 7, wherein the rocker support comprises a tang configured to fit within an opening in the rocker, the tang including an aperture for receiving a bearing for pivotally mounting the rocker on the tang.

16. The bracket of claim 7, wherein the actuator support is a clevis structure comprising a pair of parallel tabs having apertures formed therein along a common axis.

17. A bracket for mounting a hitch on a work vehicle, the hitch including a rocker comprising a rockshaft and first and second spaced apart rocker arms, first and second draft links, first and second lift links coupled to the first and second rocker arms and to the first and second draft links respectively, and first and second actuators coupled to the rocker for selectively pivotally moving the rocker arms the lift links and the draft links, the bracket comprising:
   a plurality of apertures configured to receive mounting fasteners for attaching the hitch to the vehicle;
   an actuator support for receiving and supporting the first or the second hitch actuator; and
   a rocker support for receiving and supporting a portion of the rocker;
   wherein the bracket is configured to be interchangeably mounted to a left or a right side of the vehicle.

18. The bracket of claim 17 further comprising a draft link support for receiving and supporting the first or the second draft link.

19. The bracket of claim 10, wherein the actuator support, the rocker support and the draft link support lie substantially within a common plane.

20. A bracket for mounting a hitch on a work vehicle, the hitch including a rocker comprising a rockshaft and first and second spaced apart rocker arms, first and second draft links, first and second lift links coupled to the first and second rocker arms and to the first and second draft links respectively, and first and second actuators coupled to the rocker for selectively pivotally moving the rocker arms, the lift links and the draft links, the bracket comprising:
   a plurality of apertures configured to receive mounting fasteners for attaching the hitch to the vehicle;
   an actuator support for receiving and supporting the first or the second hitch actuator; and
   a draft link support for receiving and supporting the first or the second draft link;
   wherein the bracket is configured to be interchangeably mounted to a left or a right side of the vehicle.

21. A method for mounting a hitch to a work vehicle such as an agricultural tractor comprising the steps of:
   (a) attaching a pair of interchangeable support brackets to the vehicle, each support bracket including a rocker support, an actuator support and a draft link support;
   (b) pivotally mounting a rocker to the rocker supports, the rocker including a pair of rocker arms;
   (c) securing a hitch actuator to each actuator support and to a respective rocker arm;
   (d) pivotally mounting a draft link to each draft link support; and (e) coupling a lift link to each draft link and to a respective rocker arm.

22. The method of claim 21, wherein step (b) includes the steps of inserting a bearing into a bearing aperture within each rocker support, aligning the bearing aperture of each rocker support with corresponding apertures in the rocker and inserting a pivot pin into each bearing aperture to secure the rocker for pivotal movement about the bearings.

23. The method of claim 21, wherein the vehicle includes a structural differential housing and at step (a) a first support bracket is bolted to a left side of the differential housing and a second support is bolted to a right side of the differential housing.

* * * * *